Feb. 3, 1959 L. S. HECHT 2,872,111

SERIAL BINARY ARITHMETIC UNITS

Filed April 1, 1954 3 Sheets-Sheet 1

INVENTOR.
LESTER S. HECHT,

Seymour M. Rosenberg

SERIAL BINARY ARITHMETIC UNITS

Filed April 1, 1954 3 Sheets-Sheet 2

INVENTOR.
LESTER S. HECHT,
Seymour M. Rosenberg

Feb. 3, 1959 L. S. HECHT 2,872,111

SERIAL BINARY ARITHMETIC UNITS

Filed April 1, 1954 3 Sheets-Sheet 3

INVENTOR.

LESTER S. HECHT

Seymour M. Rosenberg 2,872,111
Patented Feb. 3, 1959

2,872,111

SERIAL BINARY ARITHMETIC UNITS

Lester S. Hecht, Los Angeles, Calif., assignor to Hughes Aircraft Company, Culver City, Calif., a corporation of Delaware Application April 1, 1954, Serial No. 420,288

14 Claims. (Cl. 235—61)

This invention relates to serial binary arithmetic units, and more particularly to serial binary adders, subtracters, and adder-subtracters wherein the result digit in each binary place is formed as a function of the associated input signals and the result digit and input signals of the preceding binary place, no carry function being required.

Many adders, subtracters, and adder-subtracters are presently known, wherein the binary carry series and result, either sum or difference, are formed through separate networks, except for the inclusion of a delayed carry signal in the sum or difference producing network. Such circuits, for example, are described in U. S. Patent No. 2,609,143, entitled "Electric Computer for Addition and Subtraction," by G. R. Stibitz, issued September 2, 1952, and U. S. Patent No. 2,643,820, entitled "Circuit for Adding Binary Numbers," by F. C. Williams et al., issued June 30, 1953. In the patents by G. R. Stibitz and F. C. Williams et al., the binary carry series is generated by a separate logical network and applied to a one-binary-digit delay circuit, which may be a flip-flop. Each binary sum digit is then produced by a separate result-producing network as a function of the corresponding input signals and the preceding carry signal stored in the delay circuit.

One disadvantage of the prior-art binary adders and subtracters is that a carry flip-flop is required for each such unit used in the computer. This requires the addition, to the computer, of carry flip-flops if they are not available from other arithmetic circuits within the computer.

A second disadvantage of the prior-art binary adders, subtracters, and adder-subtracters occurs when the result signal series is utilized to control other circuits, such as a decimal correction circuit. Result signals of greater power than that produced by a logical network are then required, necessitating a buffer output circuit and associated circuits for coupling the logical network to the output circuit.

Even where an output buffer is not needed for power requirements, complementary result signals may be required. In this case, a complementer circuit is needed, a suitable complementer circuit being described in copending U. S. patent application, Serial No. 308,045, now Patent No. 2,812,451, for "Complementary Signal Generating Networks," by Daniel L. Curtis, filed September 5, 1952.

The above and other disadvantages of the prior art are obviated, according to the present invention, by forming each binary result digit as a function of the binary input signals in the corresponding binary place and the input signals and result signals in the preceding binary place. Each binary result digit signal is entered into a storage element as it is formed, and the storage element then provides an output signal indicating the result signals in the preceding binary place as the next result signal is formed. In this manner, the carry signals are effectively replaced by the input signals and the result signals in the corresponding binary place. The storage element may, in a particular application, also be utilized as a buffer circuit or complementer, thus obviating the necessity of an additional buffer stage and complementer circuit.

As will become apparent from the ensuing description, the techniques provided by the present invention are readily applicable for use in any numbering system employing binary digit signals representing magnitudes or quantities in accordance with a selected code, examples of such systems being conventional binary, binary-coded decimal, and binary-coded octal numbering systems. In order to facilitate a clear and concise description of the present invention, however, it is assumed at the outset that the serial binary arithmetic unit of the present invention is adapted to operate in a conventional binary numbering system. A conventional binary numbering system may be defined as a numbering system wherein a magnitude or quantity is represented by a group of binary digits having weights or powers of 2. Accordingly, each binary digit of a group has a weight double that of the immediately lesser order binary digit and one-half that of the immediately greater order binary digit of the group. It is further assumed that each binary input number to the arithmetic unit of the present invention is represented by series of binary electrical signals received in the order of least significant binary digit signal first and most significant binary digit last. Similarly, corresponding binary digit signals of the result are serially formed in the same order. Thus a binary digit signal of a signal series has a weight or significance twice that of a binary digit signal in the preceding binary place of the same series.

In its basic structural form the invention comprises a logical gating means, which receives a first set of input signals representing binary digits of the numbers and a second set of input signals representing binary digits in the preceding place of the numbers, for producing output signals, one output signal being produced for each binary digit of the result number. A storage element receives the output signals and produces a series of result-representing signals, each binary digit of the result number being represented by a signal signal.

For convenience, the logical gating means may be considered as divided into a first and second gating circuit; the first gating circuit receiving the first set of input signals and producing a series of first output signals having first and second levels indicating equality and inequality, respectively, between the input signals in the corresponding place; and a second gating circuit responsive to the first output signals and the second set of input signals for producing a second set of output signals which are fed to the storage means.

A single or two-input storage element may be used as the storage means. Where the storage element has only a single input circuit, the second gating circuit is mechanized to set the storage element directly to 1 or 0 according to the corresponding result digit. In this situation, the result signals, representing the delayed result digits, must actually be applied to the second gating circuit. However, where the storage element is a bistable element, such as a flip-flop, having separate 1 and 0 input circuits, a simplification may be effected in the second gating circuit by defining separate 1 and 0 setting functions. In this case, it is not necessary to actually apply the result signals to the second gating circuit, since the second output signals produced by this gating circuit are defined on the basis of the memory characteristic of the storage element. This definition recognizes the fact that if the storage element is already in the desired state, no signal need be applied to its 1-setting input circuit and that if it is in the 0 state, no signal need be applied to its 0-setting input circuit.

In a modified embodiment of the present invention, the function of the first gating circuit may be performed in a comparator circuit which is already available in the computer. A comparator circuit suitable for this operation is described in copending U. S. patent application, Serial No. 394,441, for "Electronic Magnitude Comparator," by Robert Royce Johnson, filed November 25, 1953. With but a slight modification this comparator circuit may be operated to provide the series of first output signals indicating equality or inequality between corresponding binary input digits.

Accordingly, it is an object of the invention to provide a serial binary arithmetic unit for addition or subtraction requiring no carry flip-flop, the result being formed as a function of the input signals and previous result and input signals.

Another object is to provide a serial binary arithmetic unit wherein the result signals are directly entered into an output storage element, thus eliminating the need of a separate buffer output stage or complementer circuit.

A further object is to provide a serial binary adder, subtracter, or adder-subtracter wherein the result signals are entered into an output flip-flop having separate 1 and 0 input circuits and wherein the result signals are formed as a function of the corresponding input signals and the preceding input signals.

Yet another object is to provide a serial binary adder, subtracter, or adder-subtracter producing complementary output signals, requiring only a single bistable element.

The novel features which are believed to be characteristic of the invention, both as to its organization and the method of operation, together with further objects and advantages thereof, will be better understood from the following description considered in connection with the accmpanying drawings in which several embodiments of the invention are illustrated by way of examples. It is to be expressly understood, however, that the drawings are for the purpose of illustration and description only and are not intended as a definition of the limits of the invention.

Figure 1:
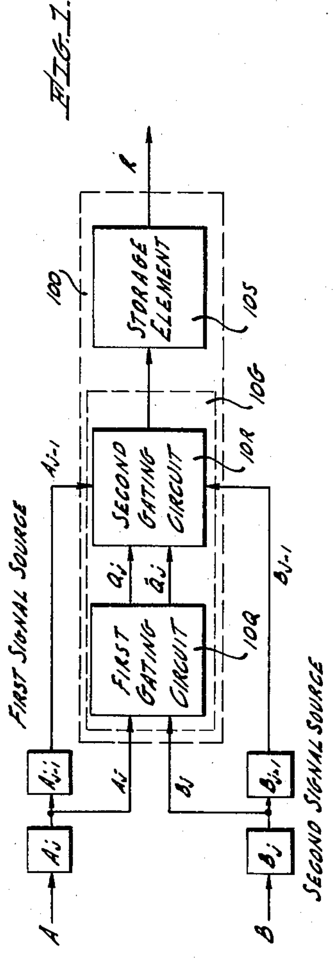
Fig. 1 is a block diagram of a serial binary arithmetic unit according to the present invention.

Referring now to the drawings, there is shown in Fig. 1 an arithmetic unit 100 for performing an operation of addition or subtraction upon first and second numbers A and B, for producing the corresponding binary result R. The numbers A and B are represented by electrical signals $A_j$ and $B_j$, respectively; and the immediately preceding binary digits of the numbers A and B are represented by the electrical signals $A_{j-1}$ and $B_{j-1}$, respectively. Each binary digit of the corresponding binary result is represented by an electrical signal $R_j$. The subscript $j$ is utilized to indicate a binary-digit position or an equivalent time interval, and the subscript $j-1$ is utilized to indicate the next lower-order binary-digit position or a binary digit signal delayed one binary digital time interval. As has been previously discussed, each of the numbers A and B and the corresponding result number R is represented by a series of binary electrical signals arriving in the order of least significant binary signal first and most significant binary signal last. Accordingly, a binary digit signal delayed one binary digit place and represented by a symbol accompanied by a subscript $j-1$ has a weight or significance one-half that of a presently received corresponding signal represented by the same symbol but accompanied by the subscript $j$.

As shown in Fig. 1, a logical gating means 10G receives the input signals $A_j$, $B_j$, $A_{j-1}$, and $B_{j-1}$, and produce an output signal series which may be defined in several manners, as will be explained below. A delay of one binary position to obtain the signals $A_{j-1}$ from the signals $A_j$ and to obtain the signals $B_{j-1}$ from the signals $B_j$ may be obtained by known techniques such as through an electrostatic delay line or through a mercury delay line. The delay may also be provided by introducing the signals $A_j$ to a first flip-flop to produce the signals $A_{j-1}$ and by introducing the signals $B_j$ to a second flip-flop to produce the signals $B_{j-1}$.

The logical gating means 10G may be divided into a first gating circuit 10Q and a second gating circuit 10R for convenience of description. The first gating circuit 10Q receives the input signals $A_j$ and $B_j$ and produces complementary signal $Q_j$ and $\bar{Q}_j$, representing equality and inequality, respectively, between the corresponding $A_j$ and $B_j$ signals. The second gating circuit 10R is responsive to the complementary signal series $Q_j$ and $\bar{Q}_j$ and the signal series $A_{j-1}$ and $B_{j-1}$, for producing a second output signal series which is applied to the storage element 10S.

Before describing the detailed structure and operation of the serial binary adder-subtracter of Fig. 1, it is advantageous to consider the basic concepts involved in binary addition and subtraction. One of the most common methods of developing these concepts is to form first a truth table involving all the possible combinations of variables under consideration, and from the truth table derive functions representing the inter-relationships of these variables. The sum function for the addition of A and B may be derived from the following truth table:

*Table I*

| $A_j$ | $B_j$ | $C^{+}_{j-1}$ | $R^{s}_{j}$ | $C^{+}_{j}$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

where $$R^{s}_{j} \text{ and } C^{+}_{j}$$

represent the binary sum and carry digits, respectively, and where $$C^{+}_{j-1}$$

represents the previous carry digit.

From the table above, the function for the sum $$R^{s}_{j}$$

may be written as follows:

$$R^{s}_{j}=C^{+}_{j-1}.(A_j.B_j+\bar{A}_j.\bar{B}_j)+\bar{C}^{+}_{j-1}.(A_j.\bar{B}_j+\bar{A}_j.B_j)$$

where the dot (.) represents the logical "and," and the plus (+) the logical "inclusive or."

From Table I it is also noted that the carry, $$C^{+}_{j}$$

may be written as a function of the sum $R^{s}_{j}$ and the binary input digits $A_j$ and $B_j$ as follows:

$$C^{+}_{j}=R^{s}_{j}.A_j.B_j+\bar{R}^{s}_{j}.(A_j+B_j)$$

and $$\bar{C}^{+}_{j}=R^{s}_{j}.(\bar{A}_j+\bar{B}_j)+\bar{R}^{s}_{j}.\bar{A}_j.\bar{B}_j$$

From the above expressions, the previous carry, $$C^{+}_{j-1}$$

may be expressed as follows:

$$C^{+}_{j-1}=R^{s}_{j-1}.A_{j-1}.B_{j-1}+\bar{R}^{s}_{j-1}.(A_{j-1}+B_{j-1})$$

$$\bar{C}^{+}_{j-1}=R^{s}_{j-1}.(\bar{A}_{j-1}+\bar{B}_{j-1})+\bar{R}^{s}_{j-1}.\bar{A}_{j-1}.\bar{B}_{j-1}$$

Then, by substitution of the value of $$C^{+}_{j-1}$$

in the sum expression above, the latter expression becomes:

$$R^s_j=[R^s_{j-1}.A_{j-1}.B_{j-1}+\overline{R}^s_{j-1}.(A_{j-1}+B_{j-1})].(A_j.B_j+\overline{A}_j.\overline{B}_j)+$$
$$[R^s_{j-1}.(\overline{A}_{j-1}+\overline{B}_{j-1})+\overline{R}^s_{j-1}.\overline{A}_{j-1}.\overline{B}_{j-1}].(A_j.\overline{B}_j+\overline{A}_j.B_j)$$

which may be written in another form as:

$$R^s_j=\overline{R}^s_{j-1}.[(A_{j-1}+B_{j-1}).(A_j.B_j+\overline{A}_j.\overline{B}_j)+\overline{A}_{j-1}.\overline{B}_{j-1}.(A_j.\overline{B}_j+\overline{A}_j.B_j)]+$$
$$R^s_{j-1}.[A_{j-1}.B_{j-1}.(A_j.B_j+\overline{A}_j.\overline{B}_j)+(\overline{A}_{j-1}+\overline{B}_{j-1}).(A_j.\overline{B}_j+\overline{A}_j.B_j)]$$

Letting $Q_j$ be a signal which is in a 1-representing state when $A_j=B_j$, and in a 0-representing state when $A_j\neq B_j$; the expression $Q_j$ may be written as follows:

$$Q_j=(A_j.B_j+\bar{A}_j.\bar{B}_j)$$

(10Q)

$$\bar{Q}_j=(A_j.\bar{B}_j+\bar{A}_j.B_j)$$

And substituting in the expression for $$R^s_j$$

above we obtain:

$$R^s_j=\overline{R}^s_{j-1}.[(A_{j-1}+B_{j-1}).Q_j+\overline{A}_{j-1}.\overline{B}_{j-1}.\overline{Q}_j]+$$
$$R^s_{j-1}.[A_{j-1}.B_{j-1}.Q_j+(\overline{A}_{j-1}+\overline{B}_{j-1}).\overline{Q}_j]$$

In a similar manner, the subtraction functions for the subtraction of B from A to form the difference $$R^d_j$$

may be derived from the following Table II:

*Table II*

| $A_j$ | $B_j$ | $C^-_{j-1}$ | $C^-_j$ | $R^d_j$ | $Q^-_j$ |
|---|---|---|---|---|---|
| 0 | 0 | 0 | 0 | 0 | 1 |
| 0 | 0 | 1 | 1 | 1 | 1 |
| 0 | 1 | 0 | 1 | 1 | 0 |
| 0 | 1 | 1 | 1 | 0 | 0 |
| 1 | 0 | 0 | 0 | 1 | 0 |
| 1 | 0 | 1 | 0 | 0 | 0 |
| 1 | 1 | 0 | 0 | 0 | 1 |
| 1 | 1 | 1 | 1 | 1 | 1 |

From Table II, the expression for the carry, $$C^-_j$$

may be written as:

$$C^-_j=R^d_j.(\overline{A}_j+B_j)+\overline{R}^d_j.\overline{A}_j.B_j$$

and $$\overline{C}^-_j=R^d_j.A_j.B_j+\overline{R}^d_j.(A_j+\overline{B}_j)$$

and the previous carry $$C^-_{j-1}$$

as follows:

$$C^-_{j-1}=R^d_{j-1}.(\overline{A}_{j-1}+B_{j-1})+\overline{R}^d_{j-1}.\overline{A}_{j-1}.B_{j-1}$$
$$\overline{C}^-_{j-1}=R^d_{j-1}.A_{j-1}.\overline{B}_{j-1}+\overline{R}^d_{j-1}.(A_{j-1}+\overline{B}_{j-1})$$
$$R^d_j=C^-_{j-1}.(A_j.B_j+\overline{A}_j.\overline{B}_j)+\overline{C}^-_{j-1}.(A_j.\overline{B}_j+\overline{A}_j.B_j)$$

Again substituting $Q_j$ for the expressions showing $A_j=B_j$ and $\bar{Q}_j$ for the expressions indicating $A_j\neq B_j$, the function for $$R^d_j$$

may be written $$R^d_j=C^-_{j-1}.Q_j+\overline{C}^-_{j-1}.\overline{Q}_j$$

and substituting for $$C^-_{j-1}$$

the difference function becomes:

$$R^d_j=[R^d_{j-1}.(\overline{A}_{j-1}+B_{j-1})+\overline{R}^d_{j-1}.\overline{A}_{j-1}.B_{j-1}].Q_j+$$
$$[R^d_{j-1}.A_{j-1}.\overline{B}_{j-1}+\overline{R}^d_{j-1}.(A_{j-1}+\overline{B}_{j-1})].\overline{Q}_j$$

which may be written in another form as:

$$R^d_j=\overline{R}^d_{j-1}.[\overline{A}_{j-1}.B_{j-1}.Q_j+(A_{j-1}+\overline{B}_{j-1}).\overline{Q}_j]+$$
$$R^d_{j-1}.[(\overline{A}_{j-1}+B_{j-1}).Q_j+A_{j-1}.\overline{B}_{j-1}.\overline{Q}_j]$$

Figure 2:
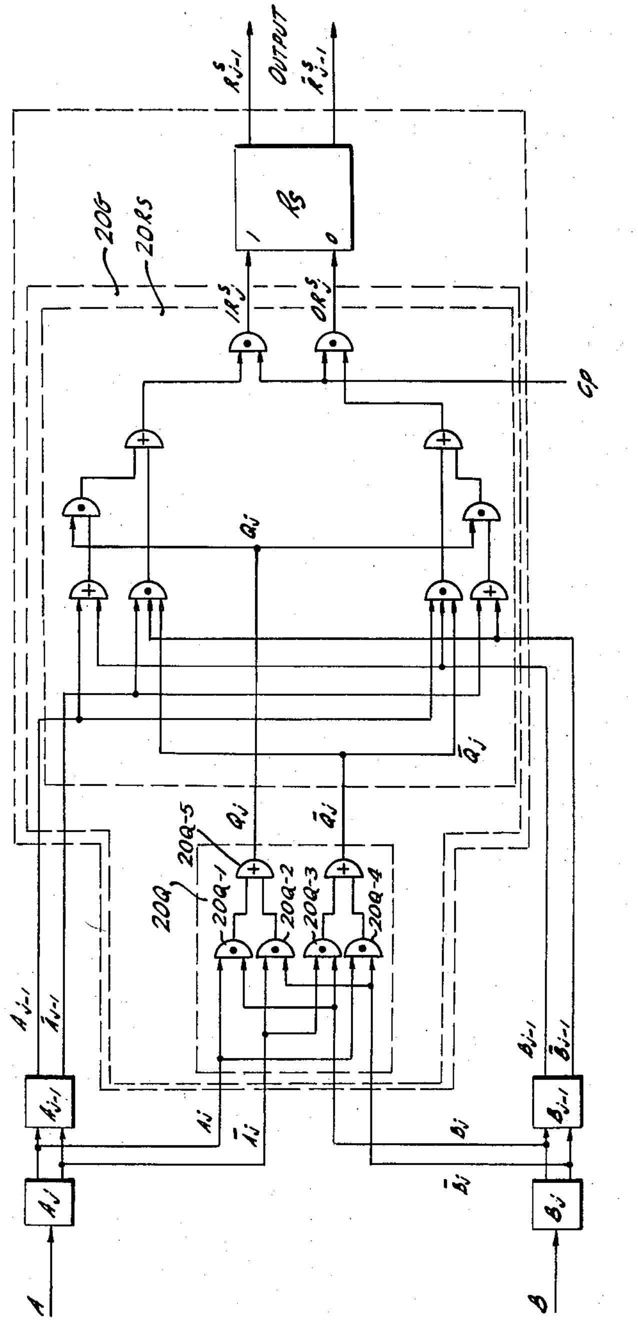
Fig. 2 is a schematic diagram of a serial binary adder according to the present invention.

Referring now to Fig. 2, there is shown a serial binary adder mechanized according to the above principles of binary addition. As shown in Fig. 2, the storage element 10S of Fig. 1 is a flip-flop R*s* having 1 and 0 input circuits and producing complementary output signals $$R^s_{j-1} \text{ and } \overline{R}^s_{j-1}$$

representing the delayed binary sum of input numbers A and B. Flip-flop R*s* is controlled through a second gating circuit **20R*s*** producing signal series $$1R^s_j \text{ and } 0R^s_j$$

which are applied to the 1 and 0 input circuits, respectively, of the flip-flop R*s*. Signal series $$1R^s_j \text{ and } 0R^s_j$$

are produced as a function of input signals $A_{j-1}$ and $\bar{A}_{j-1}$ from a first signal source, input signals $B_{j-1}$ and $\bar{B}_{j-1}$, from a second signal source, and complementary signals $Q_j$ and $\bar{Q}_j$, produced by a first gating circuit 20Q which is a specific mechanization of the first gating circuit 10Q of Fig. 1.

Before considering the specific mechanization of logical gating circuit **20R*s*** of Fig. 2, it is necessary to consider the general form of equations defining the input functions for flip-flops. The discussion here is brief, since the theory of flip-flop control functions is discussed in considerable detail in copending U. S. patent applications Serial No. 327,567, now Patent No. 2,816,223, for "Binary-Coded Flip-Flop Counters," by Eldred C. Nelson, filed December 23, 1952, and Serial No. 327,131 for "Binary-Coded Flip-Flop Counters," by Robert Royce Johnson, filed December 20, 1952.

Flip-flop R*s* in Fig. 2 is assumed to be a conventional flip-flop having 1 and 0 input circuits, such that pulses applied separately to the 1 and 0 input circuits set the flip-flop to 1 and 0 states, respectively. For example, the flip-flop R*s* may be constructed in a manner similar to that described on pages 164 to 166, inclusive, of volume 19 entitled "Waveforms" of the Radiation Laboratory Series, published by the Massachusetts Institute of Technology in 1949. It should be understood, however, that other types of flip-flops may be utilized, provided that they are controlled through a properly mechanized logical gating circuit. For example, an "over-riding" flip-flop may be utilized with the Boolean equations defining the logical gating circuit for indicating when the flip-flop is to be set to 1, regardless of its previous state. In utilizing an "overriding" flip-flop, pulses are continuously applied to the 0 input circuit of the flip-flop, so that it is set to 0 unless the logical gating circuit conditions are satisfied, in which case a pulse is applied to the 1 input circuit of the flip-flop overriding the pulse applied to the 0 input circuit and setting the flip-flop to 1.

Three general types of flip-flop input functions may be utilized to control the sequence of stable states of an associated flip-flop. According to one type of equation, the sequence of stable states of the flip-flop is directly defined so that the value of the equation (1 or 0) at a particular time indicates the next flip-flop setting. This type of function may be referred to as a "setting" function. When a setting function is utilized, the flip-flop must be an "overriding" flip-flop of the type just described, or a complementer circuit must be introduced to translate the gating output signal into complementary signals.

According to a second type of defining equation, the conditions for changing the flip-flop stable state, or triggering the flip-flop, are established. When this type of mechanization is utilized, a conventional flip-flop is employed and the gating circuit signal is applied to both the 1 and 0 input circuits of the flip-flop. In many situations, the changing type of equation may be separated into two partial-changing functions, separately defining the conditions for changing the associated flip-flop stable state from 0 to 1 and from 1 to 0. The partial-changing functions are particularly useful where the equations include the output signals of the flip-flop to be controlled. In this case, the partial-changing functions may be simplified according to rules briefly considered below which are fully described in the above-mentioned copending applications to Nelson and Johnson. The "setting," "changing," and "simplified partial-changing" functions for controlling a flip-flop F*k* (*k* representing any flip-flop) are designated, respectively, by the notations: $\text{to}Fk=$; $1Fk=0Fk=$; and $1Fk=$, and $0Fk=$, respectively.

As is more fully explained in the above-mentioned copending applications to Nelson and Johnson, any flip-flop function may be written in the form:

$$\text{to}Fk=\bar{F}^k.G+F^k.\bar{H}$$

$F^k$ and $\bar{F}^k$ representing the complementary output signals of flip-flop F*k*. This may be reduced to the simplified partial-changing functions:

$$1Fk=G$$
$$0Fk=H$$

G and H being any functions of variables other than $F^k$ and $\bar{F}^k$.

The sum function above may be written in the form of a setting function for flip-flop R*s* as follows:

$$\text{to}Rs=R^s_j=\bar{R}^s_{j-1}.[(A_{j-1}+B_{j-1}).Q_j+\bar{A}_{j-1}.\bar{B}_{j-1}.\bar{Q}_j]+R^s_{j-1}.[A_{j-1}.B_{j-1}.Q_j+(\bar{A}_{j-1}+\bar{B}_{j-1}).\bar{Q}_j]$$

where the function $[(A_{j-1}+B_{j-1}).Q_j+\bar{A}_{j-1}.B_{j-1}.\bar{Q}_j]$ and the function $[A_{j-1}.B_{j-1}.Q_j+(\bar{A}_{j-1}+\bar{B}_{j-1}).\bar{Q}_j]$ correspond to the functions G and $\bar{H}$, respectively.

The above "setting" function may also be written in the form of simplified partial-changing functions as follows:

$$1R^s_j=(A_{j-1}+B_{j-1}).Q_j+\bar{A}_{j-1}.\bar{B}_{j-1}.\bar{Q}_j=G$$
$$0R^s_j=\overline{A_{j-1}.B_{j-1}.Q_j+(\bar{A}_{j-1}+\bar{B}_{j-1}).\bar{Q}_j}$$
$$=(\bar{A}_{j-1}+\bar{B}_{j-1}).Q_j+A_{j-1}.B_{j-1}.\bar{Q}_j=H$$

The above equations may be written in the form of mechanizing functions for the gating circuits 20Q and 20R*s* in Fig. 2 as follows:

(20Q)
$$Q_j=(A_j.B_j+\bar{A}_j.\bar{B}_j).cp$$
$$\bar{Q}_j=(A_j.\bar{B}_j+\bar{A}_j.B_j).cp$$

and (20R*s*)
$$1R^s_j=[(A_{j-1}+B_{j-1}).Q_j+\bar{A}_{j-1}.\bar{B}_{j-1}.\bar{Q}_j].cp$$
$$0R^s_j=[A_{j-1}.B_{j-1}.\bar{Q}_j+(\bar{A}_{j-1}+\bar{B}_{j-1}).\bar{Q}_j].cp$$

where the signal *cp* is introduced to indicate a synchronizing "and" condition, signal *cp* occurring once each binary-digit time interval.

Each of the "and" functions in the above equations is provided in Fig. 2 with an "and" circuit which responds to signals applied to separate input terminals and producing 1-representing output signals only when all input signals are 1-representing signals. Thus, "and" circuit 20Q–1 in the gating circuit 20Q responds to signals $A_j$ and $B_j$ and produces a 1-representing output signal when both $A_j$ and $B_j$ are 1-representing signals. Similarly, "and" circuits 20Q–2, 20Q–3, and 20Q–4 respond to separately applied input signals to produce the 1-representing signal defined by the corresponding "and" functions in the equation (20Q).

Each of the "or" functions in the above equation is provided by an "or" circuit responding to separately applied input signals and producing a 1-representing output signal when any one or more of the input signals is in a 1-representing state. Thus, "or" circuit 20Q–5 responds to signals generated by the "and" circuit 20Q–1 and the "and" circuit 20Q–2 which are applied to the separate input terminals, and produce a 1-representing $Q_j$ signal when one or both of these inputs is a 1-representing signal.

In a similar manner, each "and" and "or" function of equation (20R*s*) is provided with an "and" and "or" circuit, respectively, in the second gating circuit 20R*s*.

The operation of the binary-adder section of the binary adder-subtracter of the present invention presented in Fig. 2 may be illustrated from Table III below which depicts a binary time-sequence function of the output signals of the gating circuits 20Q and 20R*s*, and the output signals of flip-flop R*s*.

*Table III*

| 10 | 9 | 8 | 7 | 6 | 5 | 4 | 3 | 2 | 1 ← *t* | | *j* |
|---|---|---|---|---|---|---|---|---|---|---|---|
| | | 0 | 0 | 1 | 1 | 1 | 1 | 1 | 0 | 0 | $A_j=62$ |
| | | 0 | 0 | 0 | 1 | 1 | 0 | 1 | 1 | 0 | $B_j=27$ |
| | 0 | 0 | 1 | 1 | 1 | 1 | 1 | 0 | 0 | 0 | $A_{j-1}$ |
| | 0 | 0 | 0 | 1 | 1 | 0 | 1 | 1 | 0 | 0 | $B_{j-1}$ |
| | | 1 | 1 | 0 | 1 | 1 | 0 | 1 | 0 | | $Q_j$ |
| | | 0 | 1 | 0 | 1 | 1 | 0 | 1 | 1 | | $1R^s_j$ |
| | | 1 | 1 | 1 | 0 | 1 | 1 | 1 | 0 | | $0R^s_j$ |
| | 0 | 1 | 0 | 1 | 1 | 0 | 0 | 1 | 0 | 0 | $R^s_{j-1}=89$ |

As indicated in Table III, the output series $$R^s_{j-1}$$

is generated after a delay of one binary-digit time interval during which the input signal series $$1R^s_j, \text{ and } 0R^s_j$$

are setting flip-flop R*s*. The operation of the logical circuits may be noted in Table III. The $Q_j$ output of the first gating circuit 20Q is in a 1-representing state during each digit time interval during which both $A_j$ and $B_j$ are the same value, that is both in 1-representing states or both in 0-representing states; while $Q_j$ is in the 0-representing state when signals $A_j$ and $B_j$ are dissimilar in value.

The one input, $$1R^s_j$$

to the R*s* flip-flop will be effective when either $A_{j-1}$ or $B_{j-1}$ is in the 1-representing state, and the signal $Q_j$ is also in the 1-representing state; or when both $A_{j-1}$ and $B_{j-1}$ are in the 0-representing state, and signal $Q_j$ is also in the 0-representing state.

Figure 3:
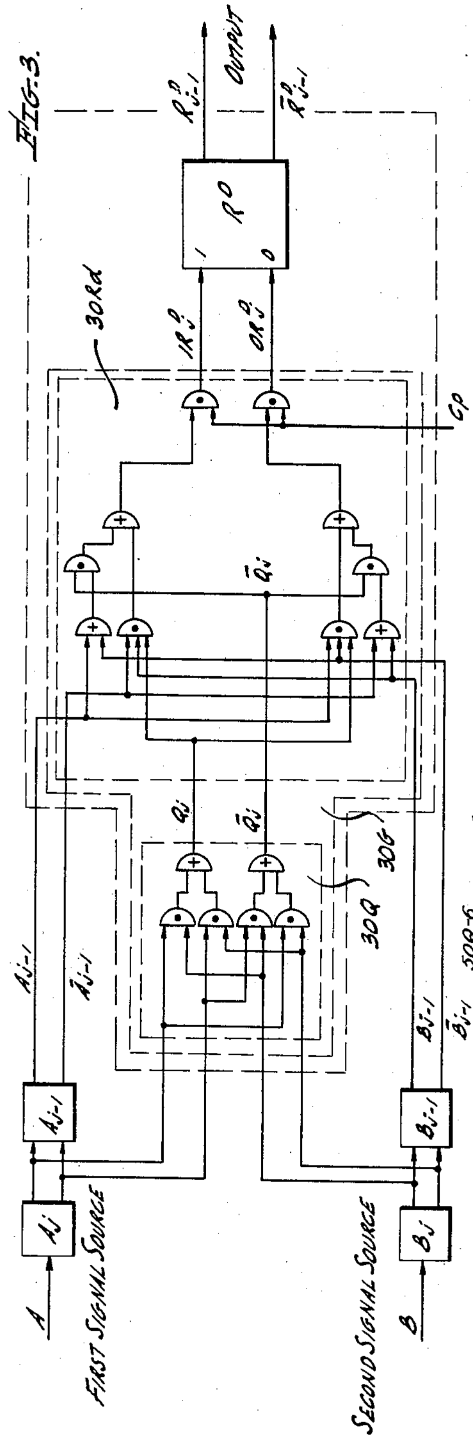
Fig. 3 is a schematic diagram of a serial binary subtracter according to the present invention.

Referring now to Fig. 3, a serial binary subtractor according to the present invention is presented. A first gating circuit 30Q generates complementary output signals $Q_j$ and $\bar{Q}_j$. It is noted that the gating circuit 30Q is similar to the first gating circuit 20Q of Fig. 2, in that the signal $Q_j$ is in a 1-representing state when input signals $A_j$ and $B_j$ are both in the 1-representing state or are both in the 0-representing state; and the signal $\bar{Q}_j$ is in a 1-representing state when $A_j$ and $B_j$ are in opposite representing states. A second gating circuit 30R*d* produces a pair of control signals $$1R^d_j \text{ and } 0R^d_j$$

as a function of the complementary signals $Q_j$ and $\bar{Q}_j$ and inputs signals $A_{j-1}$, $\bar{A}_{j-1}$, $B_{j-1}$, and $\bar{B}_{j-1}$. A flip-flop R*d*, having 1 and 0 input circuits responsive to the $$1R^d_j \text{ and } 0R^d_j$$

control signals, respectively, produces complementary output signals $$R^d_{j-1} \text{ and } 0\overline{R}^d_{j-1}$$

representing the difference of input numbers A and B, delayed one binary-digit time interval.

The second gating circuit 30R*d* is mechanized in conformity with the functions for binary subtraction previously derived. In the light of the previous discussion on flip-flop theory, these functions may be written in the form of mechanizing "setting" function as follows:

$$R^d_j=\{\overline{R}^d_{j-1}.[\overline{A}_{j-1}.B_{j-1}.Q_j+(A_{j-1}+\overline{B}_{j-1}).\overline{Q}_j]+ R^d_{j-1}.[(\overline{A}_{j-1}+B_{j-1}).Q_j+A_{j-1}.\overline{B}_{j-1}.\overline{Q}_j]\}.cp$$

which may also be written in the form of simplified partial-changing functions as:

(30R*d*)

$$1R^d_j=[\overline{A}_{j-1}.B_{j-1}.Q_j+(A_{j-1}+\overline{B}_{j-1}).\overline{Q}_j].cp$$

$$0R^d_j=[A_{j-1}.\overline{B}_{j-1}.Q_j+(\overline{A}_{j-1}+B_{j-1}).\overline{Q}_j].cp$$

The second gating circuit 30R*d* of Fig. 3 is mechanized in accordance with the above equations (30R*d*); and in light of the previous explanations for mechanization of logical functions, further detailed consideration is deemed unnecessary.

The operation of the binary subtractor of Fig. 3 is illustrated in Table IV below, wherein the input $B_j$ is subtracted from the input $A_j.(A_j-B_j)$ of the binary numbers used in Table III.

*Table IV*

$\longleftarrow t$

| 10 | 9 | 8 | 7 | 6 | 5 | 4 | 3 | 2 | 1 | | $j$ |
|---|---|---|---|---|---|---|---|---|---|---|---|
| | | 0 | 0 | 1 | 1 | 1 | 1 | 1 | 0 | 0 | $A_j=62$ |
| | | 0 | 0 | 0 | 1 | 1 | 0 | 1 | 1 | 0 | $B_j=27$ |
| | 0 | 0 | 1 | 1 | 1 | 1 | 1 | 0 | 0 | 0 | $A_{j-1}$ |
| | 0 | 0 | 0 | 1 | 1 | 0 | 1 | 1 | 0 | 0 | $B_{j-1}$ |
| | | 1 | 1 | 0 | 1 | 1 | 0 | 1 | 0 | | $Q_j$ |
| | | 0 | 0 | 1 | 0 | 0 | 1 | 1 | 1 | | $1R^d_j$ |
| | | 0 | 1 | 1 | 0 | 1 | 1 | 0 | 1 | | $0R^d_j$ |
| | 0 | 0 | 1 | 0 | 0 | 0 | 1 | 1 | 0 | 0 | $R^d_{j-1}=35$ |

Again it is noted that the final difference series is generated after a delay of one binary-digit time interval.

Figure 4:
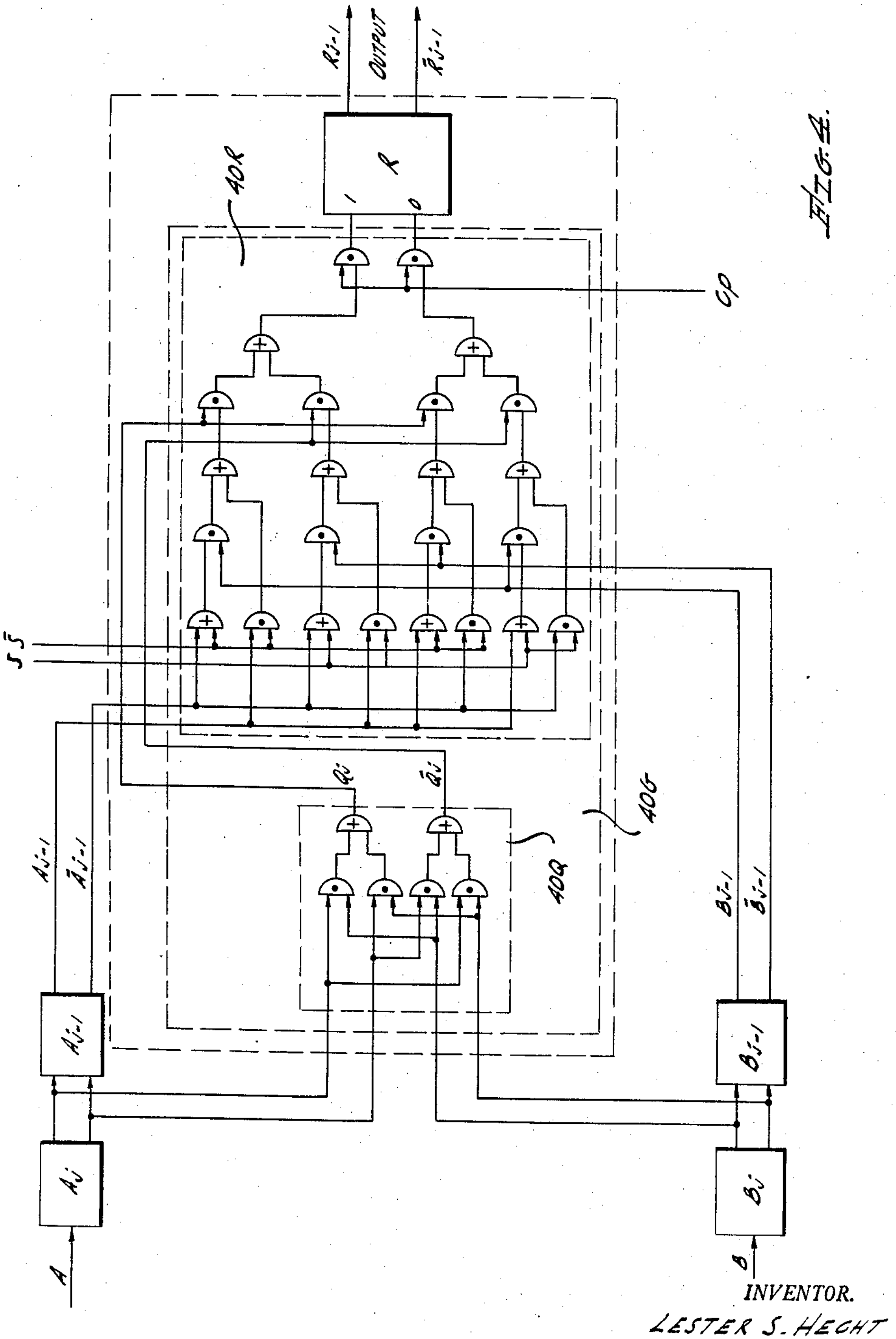
Fig. 4 is a schematic diagram of a serial binary adder-subtracter of the present invention.

A combined binary adder-subtractor of the present invention is illustrated in Fig. 4. The circuit presented in Fig. 4 may be considered as a combination of the serial binary adder presented in Fig. 2 and the serial binary subtracter presented in Fig. 3, with the sign signals S and $\bar{S}$ respectively indicating that the complementary signals $R_{j-1}$ and $\bar{R}_{j-1}$ represent the difference and sum. The signals $R_{j-1}$ and $\bar{R}_{j-1}$ are produced by a flip-flop R having 1 and 0 input circuits responsive to control signals $1R_j$ and $0R_j$, respectively, produced by a second gating circuit 40R as a function of input signals $A_{j-1}$, $\bar{A}_{j-1}$, $B_{j-1}$, and $\bar{B}_{j-1}$, and the complementary signals $Q_j$ and $\bar{Q}_j$. The signals $Q_j$ and $\bar{Q}_j$ are produced by a first gating circuit 40Q which is similar to the first gating circuits 20Q and 30Q of Figs. 2 and 3,, respectively.

By introducing the sign signals S and $\bar{S}$ into the mechanization functions (20R*s*) and (30R*d*) for addition and subtraction, respectively, these functions may be combined into a single set of mechanization functions, thus:

$$1R_j=\overline{S}.1R^s_j+S.1R^d_j$$

$$=\{\overline{S}.[(\overline{A}_{j-1}+B_{j-1}).Q_j+\overline{A}_{j-1}.\overline{B}_{j-1}.\overline{Q}_j]+ S.[\overline{A}_{j-1}.B_{j-1}.Q_j+(A_{j-1}+\overline{B}_{j-1}).\overline{Q}_j]\}.cp$$

$$0R_j=\overline{S}.0R^s_j+S.0R^d_j$$

$$=\{\overline{S}.[(A_{j-1}+\overline{B}_{j-1}).Q_j+A_{j-1}.B_{j-1}.\overline{Q}_j]+ S.[A_{j-1}.\overline{B}_{j-1}.Q_j+(\overline{A}_{j-1}+B_{j-1}).\overline{Q}_j]\}.cp$$

which reduce to the expressions:

(40R)

$$1R_j=\{[B_{j-1}.(\bar{S}+\bar{A}_{j-1})+\bar{S}.\bar{A}_{j-1}].Q_j +[\bar{B}_{j-1}.(S+\bar{A}_{j-1})+S.A_{j-1}].\bar{Q}_j\}.cp$$

$$OR_j=\{[\bar{B}_{j-1}.(\bar{S}+A_{j-1})+\bar{S}.\bar{A}_{j-1}].Q_j +[B_{j-1}.(S+A_{j-1})+S.\bar{A}_{j-1}].\bar{Q}_j\}.cp$$

representing the 1 and 0 inputs, respectively, of a single flip-flop R for both addition and subtraction.

The first gating circuit 40Q and the second gating circuit 40R of Fig. 4 are mechanized in accordance with the following equations, which are presented without further detailed explanation considered necessary:

(40Q)

$$Q_j=(A_j.B_j+\bar{A}_j.\bar{B}_j).cp$$

$$\bar{Q}_j=(A_j.\bar{B}_j+\bar{A}_j.B_j).cp$$

(40R)

$$1R_j=\{[B_{j-1}.(\bar{S}+\bar{A}_{j-1})+\bar{S}.\bar{A}_{j-1}].Q_j +[\bar{B}_{j-1}.(S+\bar{A}_{j-1})+S.A_{j-1}].\bar{Q}_j\}.cp$$

$$OR_j=\{[\bar{B}_{j-1}.(\bar{S}+A_{j-1})+\bar{S}.\bar{A}_{j-1}].Q_j +[B_{j-1}.(S+A_{j-1})+S.\bar{A}_{j-1}].\bar{Q}_j\}.cp$$

The operation of the binary adder-subtracter presented in Fig. 4 may be illustrated from Table V below, wherein the binary input signals used in the previous tables are utilized.

*Table V*

$\longleftarrow t$

| 10 | 9 | 8 | 7 | 6 | 5 | 4 | 3 | 2 | 1 | 0 | $j$ | |
|---|---|---|---|---|---|---|---|---|---|---|---|---|
| | | 0 | 0 | 1 | 1 | 1 | 1 | 1 | 0 | 0 | $A_j=62$ | |
| | | 0 | 0 | 0 | 1 | 1 | 0 | 1 | 1 | 0 | $B_j=27$ | |
| | 0 | 0 | 1 | 1 | 1 | 1 | 1 | 0 | 0 | 0 | $A_{j-1}$ | |
| | 0 | 0 | 0 | 1 | 1 | 0 | 1 | 1 | 0 | 0 | $B_{j-1}$ | |
| | | 1 | 1 | 0 | 1 | 1 | 0 | 1 | 0 | | $Q_j$ | |
| | | 0 | 1 | 0 | 1 | 1 | 0 | 1 | 1 | | $1R_j$ | (Add) $\bar{S}$ |
| | | 1 | 1 | 1 | 0 | 1 | 1 | 1 | 0 | | $0R_j$ | (Add) $\bar{S}$ |
| | 0 | 1 | 0 | 1 | 1 | 0 | 0 | 1 | 0 | 0 | $R_{j-1}$ | (Add) $\bar{S}$ |
| | | 0 | 0 | 1 | 0 | 0 | 1 | 1 | 1 | | $1R_j$ | (Subtract) $S$ |
| | | 0 | 1 | 1 | 0 | 1 | 1 | 0 | 1 | | $0R_j$ | (Subtract) $S$ |
| | 0 | 0 | 1 | 0 | 0 | 0 | 1 | 1 | 0 | 0 | $R_{j-1}$ | (Subtract) $S$ |

Figure 5:
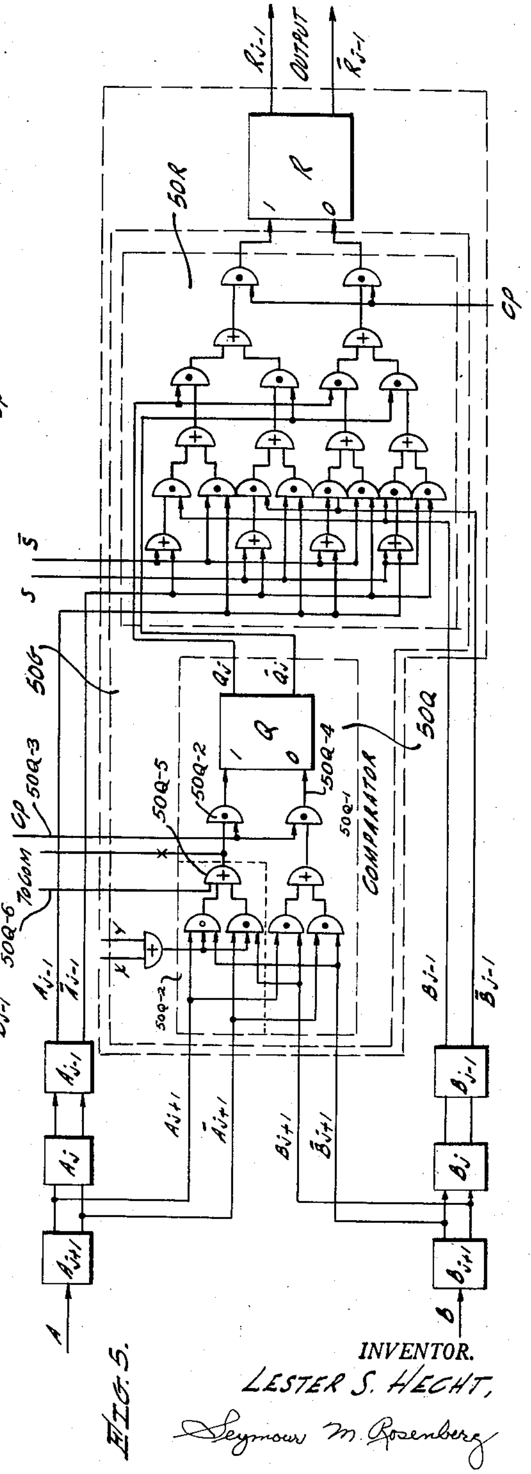
Fig. 5 is an alternative species of the serial binary adder-subtracter of Fig. 4, wherein a separate serial comparator circuit is utilized.

In Fig. 5 an alternate design of the adder-subtracter of the present invention is presented. As noted in the figure, the circuit is similar to that depicted in Fig. 4, except for the inclusion of a comparator circuit in the first gating circuit, 50Q.

The signals $Q_j$ and $\bar{Q}_j$ may be obtained by slight modification of the comparator already available in a digital computer. Such a comparator may be of the type described in copending U. S. patent application, Serial No. 394,411 for "Electronic Magnitude Comparator," by Robert Royce Johnson, filed November 25, 1953. This comparator compares the equality or inequality of two compared groups of four binary digits. In the comparator disclosed in the above-mentioned copending application, a flip-flop Q is initially set to the 1-representing state by an input (ToCom) generated at the start of each series of four binary digit pairs to be tested. If any one pair of incoming binary digits is composed of unequal binary digits, the Q flip-flop is triggered to the 0-representing state and remains in this state for the remainder of the group being tested. At the beginning of the next series group to be compared, the flip-flop is again set to the 1-representing state by the signal (ToCom). This comparator is illustrated in Fig. 5, wherein the signal input (ToCom) is received on line 50Q–3 and the inequality signal is generated on line 50Q–4.

The partial-changing functions for the Q flip-flop may be expressed as follows:

$$1Q_{j+1}=\text{ToCom}.cp$$

$$0Q_{j+1}=(A_{j+1}.\bar{B}_{j+1}+\bar{A}_{j+1}.B_{j+1}).cp$$

It is noted from these partial-changing functions that the Q flip-flop is set to the 1-representing state after the comparison command signal (ToCom), and is set to the 0-representing state after any binary-digit period during which $A_{j+1}$ and $B_{j+1}$ are unequal; but is not again returned to the 1-representing state until the (ToCom) signal is again received.

In order to make the comparator useable for generating the equality and inequality signals $Q_j$ and $\bar{Q}_j$ after each pair of binary digits is compared, an equality function $(X+Y).(A_{j+1}.B_{j+1}+\bar{A}_{j+1}.\bar{B}_{j+1})$ is logically added to the 1-input function of flip-flop Q. Signals X and Y are subtraction and addition commands, respectively. The partial-changing functions for flip-flop Q then become:

(50Q)

$$1Q_{j+1}=[\text{ToCom}+(X+Y).(A_{j+1}.B_{j+1}+\bar{A}_{j+1}.\bar{B}_{j+1})].cp$$

$$0Q_{j+1}=(A_{j+1}.\bar{B}_{j+1}+\bar{A}_{j+1}.B_{j+1}).cp$$

The signal (ToCom) is applied to one input of the "or" gate 50Q–5 by way of line 50Q–6, and the output of the "or" gate 50Q–5 is applied through an "and" gate 50Q–2 to the "1" input terminal of the Q flip-flop. The signal (ToCom) which was formerly connected to the input line 50Q–3 of the comparator is disconnected, as indicated by the "X" in the drawing.

As is well known in the prior art, the complementary output signals of a flip-flop are delayed one clock time interval, i. e., the flip-flop changes state in response to the input signals at the fall of the clock timing pulse. Since the signals $Q_j$ and $\bar{Q}_j$, generated by the second gating circuits in Figs. 2, 3, and 4, are generated without this digit time-interval delay, the input signals $A_{j+1}$ and $B_{j+1}$, preceding the input signals $A_j$ and $B_j$ by one digit time interval, must be used in the comparison circuit of Fig. 5. As the input signals $A_{j+1}$ and $B_{j+1}$ are readily available from the magnetic-drum circulating register, the utilization of these signals involves no additional circuitry.

The second gating circuit 50R and the flip-flop R are similar to that described in relation to Fig. 4; and, therefore, further detailed explanation of the remainder of Fig. 5 is deemed unnecessary. The first and second gating circuits of Fig. 5 are mechanized in accordance with the following mechanization equations:

(50Q)

$$1Q_{j+1}=[\text{ToCom}+(X+Y).(A_{j+1}.B_{j+1}+\bar{A}_{j+1}.\bar{B}_{j+1})].cp$$

$$0Q_{j+1}=[A_{j+1}.\bar{B}_{j+1}+\bar{A}_{j+1}.B_{j+1}).cp$$

(50R) $$1R_j=\{[B_{j-1}.(\bar{S}+\bar{A}_{j-1})+\bar{S}.A_{j-1}].Q_j+[\bar{B}_{j-1}.(S+\bar{A}_{j-1})+S.A_{j-1}].\bar{Q}_j\}.cp$$

$$0R_j=\{[\bar{B}_{j-1}.(\bar{S}+A_{j-1})+\bar{S}.\bar{A}_{j-1}].Q_j+[B_{j-1}.(S+A_{j-1})+S.\bar{A}_{j-1}].Q_j\}.cp$$

From the foregoing description, it is apparent that the present invention provides a serial adder-subtractor operable upon two numbers for producing the result series as a function of the input signals and the previous input and result signals, no carry flip-flop being required. It has been pointed out that the previous input signals are readily available from the computer components, such as an input circulating register, and therefore no additional circuitry is required to obtain these signals.

It has been further shown that by placing the result in a single bistable storage element, the previous result signals are readily available because of the inherent delay characteristics of such a bistable storage element. It was also explained that by using a bistable storage element, the result signals become available in the form of complementary signals of sufficient power to drive other logical circuitry of the computer, thus eliminating the need of an additional buffer stage or complementer circuit.

A further simplification of the adder-subtracter of the present invention was achieved by entering the result signal directly into a flip-flop having separate 1 and 0 input circuits. Because of the characteristics of such a flip-flop, it was shown that the result signals may be directly entered into the flip-flop as a function of the present and previous input signals, the previous result signals being effectively accounted for within the flip-flop.

While the embodiments herein have described serial binary adders, subtracters, and adder-subtracters, it should be understood that the principles taught are readily applicable to parallel adder-subtracters and sub-combinations thereof. It should also be understood that the logical mechanization equations which were utilized for defining the logical gating circuity are generic to an entire class of equations which may be derived therefrom by well known algebraic manipulations.

It should be further understood that the diodes used in the gating circuits may be replaced by any class of components performing the same or similar function such as electron emitting tubes, transistors, selenium rectifiers, or the like. It should also be understood that the electronic flip-flops employed may be replaced by any storage or delay element such as a magnetic, dielectric, or sonic delay line.

Although the present invention has been described in relation to binary electrical pulses, it should be apparent that the principles herein taught are equally applicable to any two-condition signal system such as mark space, symmetrical wave, or carrier modulation system. It should be further apparent that the present invention is not limited to purely binary number systems but is equally operable with any binary digit coded system such as the binary-coded decimal system, the binary-coded octal system, and the like.

The embodiments herein described utilize electrical signals, electrical diodes, and electronic flip-flops, but it should be clearly understood that the principles herein taught are equally applicable to electro-mechanical, mechanical, hydraulic, or chemical components having unirectional features, two stable states, and storage capacity.

What is claimed as new is:

1. An arithmetic unit for performing an operation of addition or subtraction upon first and second numbers to produce the corresponding result, each number being represented by a different pair of input signal series, each of said pairs including a series of first input signals and a series of second input signals, each first input signal representing a binary digit in a corresponding binary-digit place of the associated number and each second input signal representing a binary digit in the preceding next lower-order binary-digit place of the associated number, the result including a series of binary digits represented by a corresponding series of result signals; said arithmetic unit comprising: first means, responsive to the first input signals, for producing a series of first output signals, each first output signal indicating equality between the corresponding first input signals; second means coupled to said first means and responsive to said first output signals and the second input signals for producing a series of second output signals; and storage means coupled to said second means and responsive to said second ouput signals for producing a series of output signals representing the corresponding result.

2. An arithmetic unit for performing an operation of addition or subtraction upon first and second numbers, to produce the corresponding result, each number being represented by a different pair of input signal series, each of said pairs including a series of first input signals and a series of second input signals, each first input signal representing a binary digit in the corresponding place of the associated number and each second input signal representing the binary digit in the preceding next lower-order binary-digit place of said number, said result including a series of binary digits represented by a corresponding series of result signals; said arithmetic unit comprising: signal combining means, responsive to each pair of first input signals, for producing a two-level signal having first and second levels representing equality and inequality, respectively, between the corresponding pair of first input signals; output circuit means coupled to said signal combining means and responsive to said two-level signals and the second input signals, for producing a series of control signals; and storage means coupled to said output circuit means for receiving said control signals and producing output signals representing the binary digits of the result.

3. The arithmetic unit defined in claim 1, wherein said storage means is a single input bistable element, directly set to its bistable states by said second output signals and producing complementary output signals representing said result.

4. The arithmetic unit defined in claim 1, wherein said second output signals consist of first and second control signals and wherein the storage means is a flip-flop having 1 and 0 input circuits coupled to said second output means and responsive to said first and second control signals, respectively, for producing complementary output signals representing said result.

5. An arithmetic unit for performing an operation of addition or subtraction upon first and second numbers A and B, to produce the corresponding result, each binary digit of said first number being represented by an electrical signal designated $A_j$ and the immediately preceding next lower-order binary digit by an electrical signal designated $A_{j-1}$, and each binary digit of said second number being represented by an electrical signal designated $B_j$ and the immediately preceding next lower-order binary digit by an electrical signal designated $B_{j-1}$, and each digit of said result number being represented by an electrical signal designated $R_j$; said adder-subtracter comprising: first means, responsive to electrical signals $A_j$ and $B_j$ for producing a series of first output signals, each signal of said first output signals indicating similar digit values in signal $A_j$ and the corresponding signal $B_j$; second means coupled to said first means and responsive to said first output signals and signals $A_{j-1}$ and $B_{j-1}$, for producing a second output signal series, one second output signal being produced upon occurrence of each signal $A_{j-1}$; and a bistable storage element coupled to said second means and responsive to said second output signals for producing a third output signal series corresponding to the result delayed one binary-digit time interval.

6. The arithmetic unit defined in claim 5, wherein said storage means is a single input flip-flop directly set to its stable states by said second output signals and producing complementary output signals $$R^s_{j-1} \text{ and } \overline{R}^s_{j-1}$$

complementary signals $$R^s_{j-1} \text{ and } \overline{R}^s_{j-1}$$

representing the sum $$R^s_j$$

of A and B delayed one binary-digit time interval; and wherein the second output means are connected to receive the input signals $A_j$ and $B_j$ and the delayed input signals $A_{j-1}$ and $B_{j-1}$ and to operate in a particular interrelationship on said signals for the production of signals $$R^s_j$$

in accordance with the logical equation:

$$R^s_j=\overline{R}^s_{j-1}.[(A_{j-1}+B_{j-1}).(A_j.B_j+\overline{A}_j.\overline{B}_j)+\overline{A}_{j-1}.\overline{B}_{j-1}.(A_j.\overline{B}_j+\overline{A}_j.B_j)]+$$
$$R^s_{j-1}.[A_{j-1}.B_{j-1}.(A_j.B_j+\overline{A}_j.\overline{B}_j)+(\overline{A}_{j-1}+\overline{B}_{j-1}).(A_j.\overline{B}_j+\overline{A}_j.B_j)]$$

where the dot (.) and the plus (+) represent the logical "and" and "or" respectively, and the bar (–) represents the complementary state and the signal $$R^s_j$$

representing a setting relationship for triggering the flip-flop to a particular state and for maintainnig the flip-flop in that state.

7. The arithmetic unit defined in claim 5, wherein said second output signals consist of a first and second control signal series designated $$1R^s_j \text{ and } 0R^s_j$$

respectively, and wherein said storage means is a flip-flop coupled to said second means and having a 1 and a 0 input circuit responsive to said first and second control signal series, respectively, and producing complementary output signals designated $$R^s_{j-1} \text{ and } \overline{R}^s_{j-1}$$

representing the sum of A and B; and wherein the output means are connected to receive the input signals $A_j$ and $B_j$ and the immediately preceding input signals $A_{j-1}$ and $B_{j-1}$ and to operate in a particular interrelationship on said signals for the production of signals $$1R^s_j \text{ and } 0R^s_j$$

in accordance with the following equations:

$$1R^s_j=(A_{j-1}+B_{j-1}).(A_j.B_j+\overline{A}_j.\overline{B}_j)+$$
$$\overline{A}_{j-1}.\overline{B}_{j-1}.(A_j.\overline{B}_j+\overline{A}_j.B_j)$$
$$0R^s_j=(\overline{A}_{j-1}+\overline{B}_{j-1}).(A_j.B_j+\overline{A}_j.\overline{B}_j)+$$
$$A_{j-1}.B_{j-1}.(A_j.\overline{B}_j+\overline{A}_j.B_j)$$

the dot (.) and the plus (+) representing the logical "and" and "or" respectively, and the bar (–) the complementary state and $$1R^s_j$$

indicating the introduction of a signal to the "1" input circuit of said flip-flop and $$0R^s_j$$

indicating the introduction of a signal to the "0" input circuit of said flip-flop.

8. The adder-subtracter defined in claim 5, wherein the binary result represents the difference of B from A, wherein said second output signals directly represent a difference series $$R^d_j$$

and wherein said bistable storage element is a single-input flip-flop directly set to its bistable states by said second output signals and producing complementary output signals $$R^d_{j-1} \text{ and } \overline{R}^d_{j-1}$$

representing the delayed result; and wherein said output means are connected to receive the input signals $A_j$ and $B_j$ and the immediately preceding input signals $A_{j-1}$ and $B_{j-1}$ and to operate in a particular interrelationship on said signals for the production of signals in accordance with the following equation:

$$R^d_j=\overline{R}^d_{j-1}.[\overline{A}_{j-1}.B_{j-1}.(A_j.B_j+\overline{A}_j.\overline{B}_j)+(A_{j-1}+\overline{B}_{j-1}).(A_j.\overline{B}_j+\overline{A}_j.B_j)]+$$
$$R^d_{j-1}.[(\overline{A}_{j-1}+B_{j-1}).(A_j.B_j+\overline{A}_j.\overline{B}_j)+A_{j-1}.\overline{B}_{j-1}.(A_j.\overline{B}_j+\overline{A}_j.B_j)$$

the dot (.) and plus (+) representing the logical "and" "or," respectively, and the bar (–) over the signals the complementary state and $$R^d_j$$

representing a setting relationship for triggering the flip-flop to a particular state and for maintaining the flip-flop in the particular state.

9. The arithmetic unit of claim 5, wherein said second output signals consist of a first and second control signal series designated $$1R_j^d \text{ and } 0R_j^d$$

respectively, and wherein said storage means is a flip-flop having 1 and 0 input circuits responsive to said first and second control signal series, respectively, and producing complementary output signals designated $$R_{j-1}^d \text{ and } \overline{R}_{j-1}^d$$

representing the difference of B from A; and wherein the output circuit means are connected to receive the input signals $A_j$ and $B_j$ and the immediately preceding input signals $A_{j-1}$ and $B_{j-1}$ and to operate on said signals in a particular interrelationship for the production of output signals in accordance with the following equations:

$$1R_j^d=\overline{A}_{j-1}.B_{j-1}.(A_j.B_j+\overline{A}_j.\overline{B}_j)+(A_{j-1}+\overline{B}_{j-1}).(A_j.\overline{B}_j+\overline{A}_j.B_j)$$

$$0R_j^d=A_{j-1}.\overline{B}_{j-1}.(A_j.B_j+\overline{A}_j.\overline{B}_j)+(\overline{A}_{j-1}+B_{j-1}).(A_j.\overline{B}_j+\overline{A}_j.B_j)$$

the dot (.) and the plus (+) representing the logical "and" and "or," respectively, and the bar (–) over the signals the complementary state and $$1R_j^d$$

indicating the introduction of a signal to the "1" input circuit of said flip-flop and $$0R_j^d$$

indicating the introduction of a signal to the "0" input circuit of said flip-flop.

10. The serial binary arithmetic unit defined in claim 5, wherein said first output signals consist of a pair of complementary electrical signal series designated $Q_j$ and $\bar{Q}_j$, respectively; and wherein said first output signal means are connected to receive the input signals $A_j$ and $B_j$ and to operate on said signals in a particular interrelationship for the production of signals in accordance with the following equations:

$$Q_j=A_j.B_j+\bar{A}_j.\bar{B}_j$$
$$\bar{Q}_j=A_j.\bar{B}_j+\bar{A}_j.B_j$$

the dot (.) and the plus (+) representing the logical "and" and "or," respectively, and the bar (—) over the signals the complementary state.

11. An arithmetic unit for adding first and second numbers A and B, each binary digit of numbers A and B being represented by binary electrical signals $A_j$ and $B_j$, respectively, and the immediately preceding next lower-order binary digits of numbers A and B by binary electrical signals $A_{j-1}$ and $B_{j-1}$, respectively; said unit comprising: a first gating circuit, including a plurality of logical "and" and "or" circuits, for producing complementary signals $Q_j$ and $\bar{Q}_j$, representing equality and inequality, respectively, between corresponding $A_j$ and $B_j$ signals; a second gating circuit, including a plurality of logical "and" and "or" circuits, said second gating circuit being coupled to said first gating circuit and responsive to signals $A_{j-1}$, $B_{j-1}$, $Q_j$, and $\bar{Q}_j$ for producing a pair of control signals $$1R_j^s \text{ and } 0R_j^s$$

respectively; and a flip-flop $Rs$ having separate 1 and 0 input circuits responsive to said signals $$1R_j^s \text{ and } 0R_j^s$$

respectively, and producing complementary electrical signals $$R_{j-1}^s \text{ and } \overline{R}_{j-1}^s$$

representing the sum of A and B.

12. An arithmetic unit for subtracting a second number B from a first number A, each digit of numbers A and B being represented by binary electrical signals $A_j$ and $B_j$, respectively, and the immediately preceding next lower-order digits of numbers A and B by binary electrical signals $A_{j-1}$ and $B_{j-1}$, respectively; said unit comprising: a first gating circuit including a plurality of logical "and" and "or" circuits, for producing complementary electrical signals $Q_j$ and $\bar{Q}_j$ representing equality and inequality, respectively, between corresponding $A_j$ and $B_j$ signals; a second gating circuit, including a plurality of logical "and" and "or" circuits, coupled to said first gating circuit and responsive to signals $A_{j-1}$, $B_{j-1}$, $Q_j$, and $\bar{Q}_j$, for producing a pair of control signal series $$1R_j^d \text{ and } 0R_j^d$$

and a flip-flop $Rd$, having separate 1 and 0 input circuits coupled to said second gating circuit and responsive to said control signal series $$1R_j^d \text{ and } 0R_j^d$$

respectively, and producing complementary electrical signals $$R_{j-1}^d \text{ and } \overline{R}_{j-1}^d$$

representing the difference of B from A.

13. An arithmetic unit for performing addition or subtraction in response to electrical sign signals $\bar{S}$ and S, respectively, upon numbers A and B and producing the corresponding result number R, each digit of numbers A and B being represented by binary electrical signals $A_j$ and $B_j$, respectively, and the immediately preceding next lower-order digits of numbers A and B by binary electrical signals $A_{j-1}$ and $B_{j-1}$, respectively; said unit comprising: a first gating circuit, including a plurality of logical "and" and "or" circuits, for producing complementary signals $Q_j$ and $\bar{Q}_j$, representing equality and inequality, respectively, between corresponding $A_j$ and $B_j$ signals; a second gating circuit, including a plurality of logical "and" and "or" circuits, responsive to signals $A_{j-1}$, $B_{j-1}$, $Q_j$, and $\bar{Q}_j$, and to the sign signals $\bar{S}$ and S for producing a pair of control signals $1R_j$ and $0R_j$, respectively to represent the results of binary addition or subtraction in accordance with the electrical sign signals $\bar{S}$ and S, respectively; and a flip-flop R, having separate 1 and 0 input circuits, responsive to said $1R_j$ and $0R_j$ signals, respectively, and producing complementary electrical signals $R_{j-1}$ and $\bar{R}_{j-1}$ representing the result number R.

14. An arithmetic unit for performing an operation of adidtion or subtraction upon first and second numbers A and B in response to complementary sign signals S and $\bar{S}$ to produce the corresponding result, each binary digit of said first number being represented by an electrical signal deginated $A_j$ and the immediately preceding next lower-order binary digit by an electrical signal designated $A_{j-1}$, each binary digit of said second number being represented by an electrical signal designated $B_j$ and the immediately preceding next lower order binary digit by an electrical signal designated $B_{j-1}$, and each binary digit of said result number being represented by a pair of complementary electrical signals designated $R_j$ and $\bar{R}_j$; said adder-subtracter comprising first means, responsive to electrical signals $A_j$ and $B_j$ and connected to produce complementary pairs of first output signals $Q_j$ and $\bar{Q}_j$ in accordance with the logical equations:

$$Q_j=A_j.B_j+\bar{A}_j.\bar{B}_j$$
$$\bar{Q}_j=A_j.\bar{B}_j+\bar{A}_j.B_j$$

where the dot (.) and the plus (+) represent the logical "and" and "or," respectively, and the bar (–) over a symbol of a signal indicates the complement of the signal; second means coupled to said first means and responsive to said first output signals $Q_j$ and $\bar{Q}_j$ and signals $A_{j-1}$ and $B_{j-1}$ and connected to produce a second output signal series consisting of a pair of control signals designated $1R_j$ and $0R_j$, respectively, in accordance with the logical equations:

$$1R_j=[B_{j-1}\cdot(\bar{S}+\bar{A}_{j-1})+\bar{S}.A_{j-1}]\cdot Q_j+[\bar{B}_{j-1}\cdot(S+\bar{A}_{j-1})+S.A_{j-1}]\cdot\bar{Q}_j$$

$$0R_j=[\bar{B}_{j-1}\cdot(\bar{S}+A_{j-1})+\bar{S}.\bar{A}_{j-1}]\cdot Q_j+[B_{j-1}\cdot(S+A_{j-1})+S.\bar{A}_{j-1}]\cdot\bar{Q}_j$$

where the parentheses ( ) and brackets [ ] represent the logical "and"; and a bistable flip-flop coupled to said second means and having one and zero input circuits, responsive to said $1R_j$ and $0R_j$ signals, respectively, and producing complementary output signals $R_j$ and $\bar{R}_j$ representing the binary result.

References Cited in the file of this patent

UNITED STATES PATENTS

| | | |
|---|---|---|
| 2,571,680 | Carbrey | Oct. 16, 1951 |
| 2,775,402 | Weiss | Dec. 25, 1956 |

FOREIGN PATENTS

| | | |
|---|---|---|
| 1,041,729 | France | June 3, 1953 |
| 1,044,678 | France | June 24, 1953 |